(12) United States Patent
Shahana

(10) Patent No.: US 7,048,660 B2
(45) Date of Patent: May 23, 2006

(54) BICYCLE DERAILLEUR WITH A FLEXIBLE BASE MEMBER

(75) Inventor: Satoshi Shahana, Osaka (JP)

(73) Assignee: Shimano, Inc., Sakai (JP)

( * ) Notice: Subject to any disclaimer, the term of this patent is extended or adjusted under 35 U.S.C. 154(b) by 241 days.

(21) Appl. No.: 10/604,378

(22) Filed: Jul. 15, 2003

(65) Prior Publication Data

US 2004/0177713 A1    Sep. 16, 2004

(30) Foreign Application Priority Data

Jul. 29, 2002    (JP)    .............................. 2002-220269

(51) Int. Cl.
*F16H 61/00*    (2006.01)

(52) U.S. Cl. .......................................... 474/80; 474/80
(58) Field of Classification Search ............ 474/78–82; 16/221, 227; 403/119
See application file for complete search history.

(56) References Cited

U.S. PATENT DOCUMENTS

| | | | |
|---|---|---|---|
| 3,259,398 A | * | 7/1966 | Hattan ......................... 474/82 |
| 3,803,933 A | | 4/1974 | Huret et al. |
| 3,927,904 A | | 12/1975 | Bergles |
| 4,789,379 A | | 12/1988 | Ozaki et al. |
| 5,190,501 A | | 3/1993 | Schwerdhoefer |
| 5,397,273 A | * | 3/1995 | Ando .......................... 474/82 |

FOREIGN PATENT DOCUMENTS

| | | | | |
|---|---|---|---|---|
| CH | 337740 | * | 8/1959 | .................. 474/82 |
| DE | (25072130 A1 | * | 8/1975 | .................. 474/82 |
| GB | 732035 | | 6/1955 | |
| JP | 1-136888 | | 5/1989 | |
| JP | 10-16865 | | 1/1998 | |

* cited by examiner

Primary Examiner—Marcus Charles
(74) Attorney, Agent, or Firm—James A. Deland

(57) ABSTRACT

A bicycle derailleur comprises a base member, a link mechanism coupled to the base member, and a chain guide coupled to the link mechanism so that the chain guide moves relative to the base member to move a chain among a plurality of sprockets. The base member comprises a first portion structured to mount to a bicycle frame and a second portion structured to mount to the link mechanism, wherein the first portion and the second portion are structured to move relative to each other.

17 Claims, 5 Drawing Sheets

BICYCLE DERAILLEUR WITH A FLEXIBLE BASE MEMBER

BACKGROUND OF INVENTION

The present invention is directed to bicycles and, more particularly, to a bicycle derailleur with a flexible base member.

Bicycles are used both for general transportation as well as recreational activities. Sometimes the bicycle is transported to locations away from home before being ridden. As a result, in recent years bicycles have been developed with folding chasses to make them more compact to facilitate transportation.

Many bicycles currently available have multistage transmissions that allow the rider to select a proper gear ratio to accommodate changing riding conditions. Many such transmissions are equipped with a rear derailleur that shifts a drive chain among a plurality of sprockets that are mounted around the rear wheel axle. One conventional derailleur is disclosed in Japanese Unexamined Patent Application Number 6-227476. The rear derailleur taught in this publication comprises a base member mounted to the bicycle frame, a four-point link mechanism mounted to the base member, and a chain guide coupled to the four-point link mechanism. When this rear derailleur is operated, the four-point link mechanism moves the chain guide laterally onto any one of a plurality of sprockets mounted to the rear wheel axle.

When a conventional derailleur is mounted on a conventional folding bicycle, particularly a bicycle with a frame that folds from front to back, the rear derailleur sometimes interferes with the front wheel when the bicycle is folded. Such interference of the rear derailleur with the front wheel makes it impossible to fold the bicycle as compactly as desired.

SUMMARY OF INVENTION

The present invention is directed to various features of a bicycle derailleur. In one embodiment, a bicycle derailleur comprises a base member, a link mechanism coupled to the base member, and a chain guide coupled to the link mechanism so that the chain guide moves relative to the base member to move a chain among a plurality of sprockets. The base member comprises a first portion structured to mount to a bicycle frame and a second portion structured to mount to the link mechanism, wherein the first portion and the second portion are structured to move relative to each other.

Additional inventive features will become apparent from the description below, and such features alone or in combination with the above features may form the basis of further inventions as recited in the claims and their equivalents.

DETAILED DESCRIPTION

Figure 1:
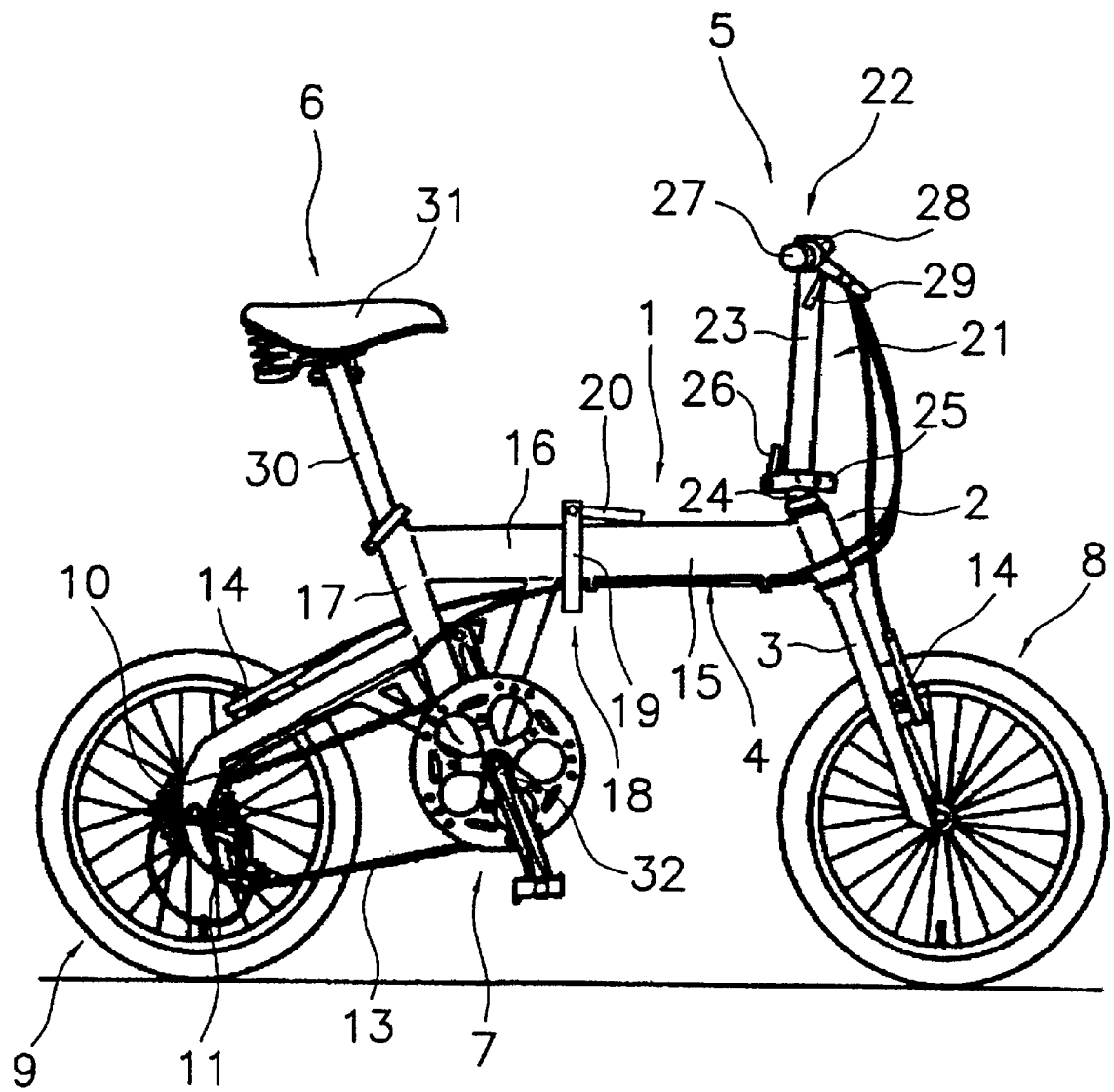
FIG. 1 is a side view of a particular embodiment of a bicycle that includes a rear derailleur.

FIG. 1 is a side view of a particular embodiment of a folding bicycle 1. The folding bicycle comprises a folding frame body 2 that is foldable at its medial portion, a front fork 3, a handlebar assembly 5, a saddle 6 comprising a seat post 30 and seat 31, a drive assembly 7, a front wheel 8, a rear wheel 9 that supports a plurality of sprockets 10 with differing numbers of teeth around a hub axle 12, a chain 13, a rear derailleur 11 that shifts the chain 13 onto any one of the sprockets 10 in response to a gearshift operation, and front and rear brakes 14.

Frame body 2 comprises a first frame body 15, a second frame body 16 rotatably attached to first frame body 15, and a folding member 18 that foldably links first frame body 15 and second frame body 16. First frame body 15 has a horizontal tube 4, wherein front fork 3 is rotatably mounted at the front of horizontal tube 4 about an axis inclined diagonally forward, and front wheel 8 is attached at the lower end of front fork 3. Second frame body 16 has a seat tube 17 at an intermediate location, wherein seat post 30 of saddle 6 is mounted at an upper end of seat tube 17, and drive assembly 7 is mounted at the lower end (bottom bracket portion) of seat tube 17. Drive assembly 7 comprises a gear crank 32 and a plurality of front sprockets 32, wherein chain 13 can be engaged on any one of the plurality of sprockets 32. Rear wheel 9 is rotatably mounted at the back end of second frame body 16.

Folding member 18 comprises a hinge 19 and a lever 20, wherein hinge links first frame body 15 and second frame body 16 together, and lever 20 locks and unlocks hinge 19. Frame body 2 is rotatably folded from front to back by means of hinge 19. In the service position, hinge 19 is locked by means of lever 20 so that the frame body 2 comprising first frame body 15 and second frame body 16 is maintained rigidly straight during riding.

Handlebar assembly 5 comprises a foldable handlebar stem 21 and a handlebar 22 fastened onto the upper end of handlebar stem 21. Handlebar stem 21 comprises a first handlebar stem body 23 and a second handlebar stem body 24 coupled together by a hinge 25. A lever 26 selectively locks and unlocks hinge 25. Handlebar 22 is provided with a grip 27, gearshift control assembly 28, and brake control assembly 29.

Figure 2:
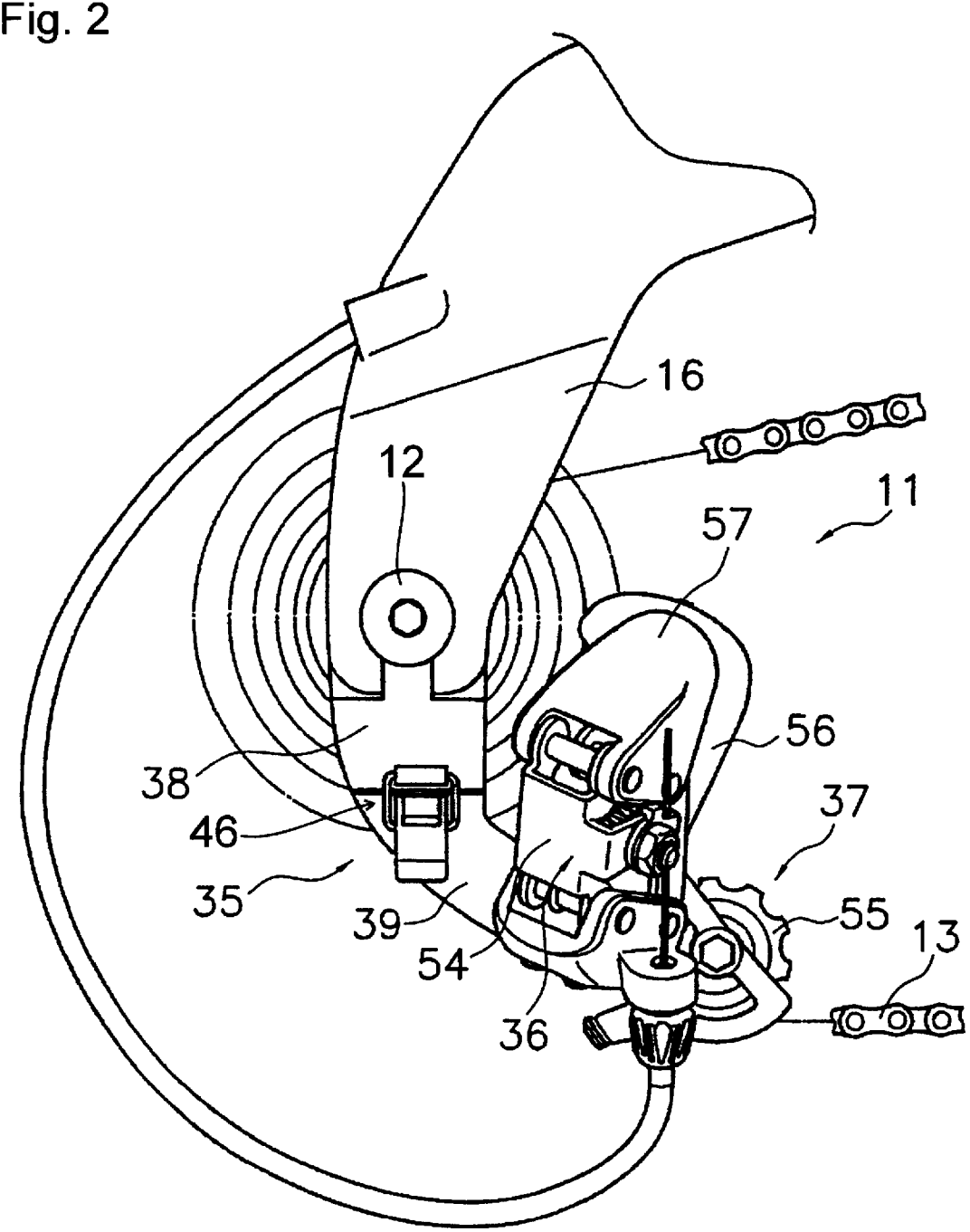
FIG. 2 is a side view of a particular embodiment of a rear derailleur.
Figure 3:
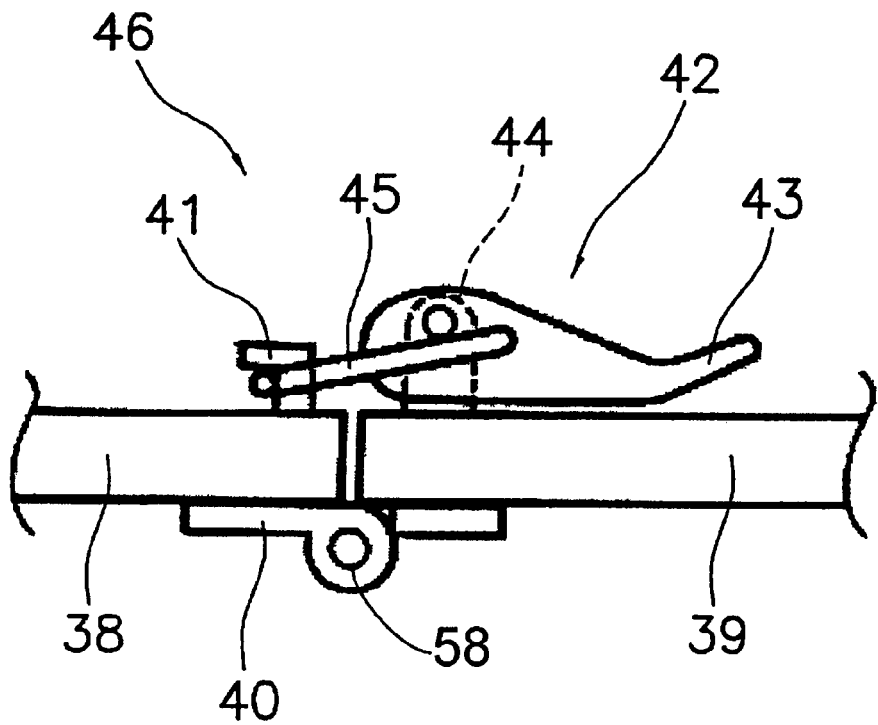
FIG. 3 is a detailed view of a particular embodiment of a coupler for the base member of the derailleur shown in FIG. 2.
Figure 4:
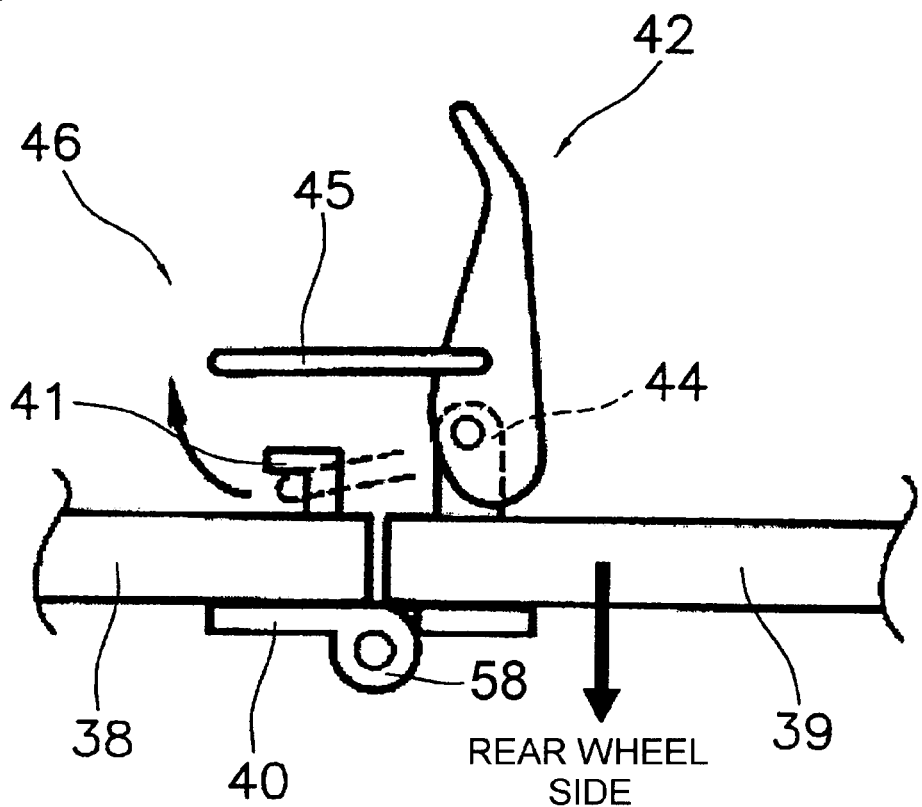
FIG. 4 is a view of the coupler in an unlocked state.

As shown more clearly in FIGS. 2–4, rear derailleur 11 is mounted on the back end of second frame body 16. Rear derailleur 11 comprises a flexible (e.g., foldable) base member 35, a four-point link mechanism 36 mounted on base member 35, and a chain guide 37 disposed on four-point link mechanism 36.

The four-point link mechanism 36 moves chain guide 37 in a direction parallel to the hub axle 12. Four-point link mechanism 36 has two link arms 54 (only one of which is shown in the drawings) of equal length. The basal ends of link arms 54 are rotatably linked to second base member body 39, and the distal ends of link arms 54 rotatably support chain guide 37. Chain guide 37 comprises a pair of pulleys 55 (only one of which is shown in the drawings), a guide frame 56 rotatably supporting the pulleys 55, and a bracket 57. Guide frame 56 is coupled to bracket 57 for rotation around an axis parallel to the hub axle 12, and bracket 57 is rotatably coupled to the distal ends of link arms 54.

Base member 35 comprises a first base member body 38 and a second base member body 39 coupled to the four-point link mechanism 36. A hinge 40 rotatably couples first base member body 38 and second base member body 39 together through a pivot shaft 58. First base member body 38 and hub axle 12 are integrally mounted to the back end of second frame body 16.

A locking mechanism 46 locks first base member body 38 and second base member body 39 into the service position and unlocks first base member body 38 and second base member body 39 so that they may be moved into a folded position. As shown in FIG. 3, locking mechanism 46 has a buckle construction in this embodiment. More specifically, locking mechanism 46 comprises a hook 41 disposed on first base member body 38; a lever member 42 rotatably mounted on second base member body 39; and a catch member 45 disposed on lever member 42 for engaging hook 41.

The distal end of hook 41 projects from first base member body 38 in a hook configuration, and hook 41 is attached in proximity to the boundary between first base member body 38 and second base member body 39. Lever member 42 has a control portion 43 at its distal end, and lever member 42 is swingably supported on second base member body 39 by means of a swing support member 44 that projects upwardly from second base member body 39 in proximity to the boundary between first base member body 38 and second base member body 39. Catch member 45 is swingably mounted to an intermediate portion of lever member 42, and it comprises a wire material bent into a "C" configuration. With the distal end of catch member 45 engaging hook 41, lever member 42 is swung past the dead point (where the contact point between catch member 45 and hook 41, the rotational axis of lever member 42, and the rotational axis of catch member 45 at lever member 42 lie on a straight line) as shown in FIG. 3 to place the locking mechanism 46 in the locked position.

When bicycle 1 is to be used, the hinge 19 on frame 1 is locked by means of lever 20 so that first frame body 15 and second frame body 16 are rigidly fixed together in a straight line. Also, hinge 25 on handlebar stem 21 is locked by means of lever 26 first handle stem body 23 and second handle stem body 24 are rigidly linked together. When bicycle 1 is to be folded up, lever 20 on frame 1 is turned in order to unlock hinge 19, and catch member 45 is disengaged from hook 41. The first frame body 15 then may be rotated in the horizontal direction towards the second frame body 16 with the position of the folding member 18 as the rotational axis. Also, lever 26 is rotated to unlock hinge 25, and first handlebar stem body 23 may be folded towards second handlebar stem body 24 and front fork 3.

When performing the folding operation, the sidewalls of rear wheel 9 and front wheel 8 will come into proximity with one another, and rear derailleur 11 may contact front wheel 8. To enable the bicycle to be folded more compactly, interference between the rear derailleur 11 and front wheel 8 must be minimized. To accomplish this lever member 42 of locking mechanism 46 is rotated as shown in FIG. 4, catch member 45 is disengaged from hook 41, and second base member body 39 may be rotated towards rear wheel 9 so that contact between rear derailleur 11 and front wheel 8 can be avoided.

Figure 5:
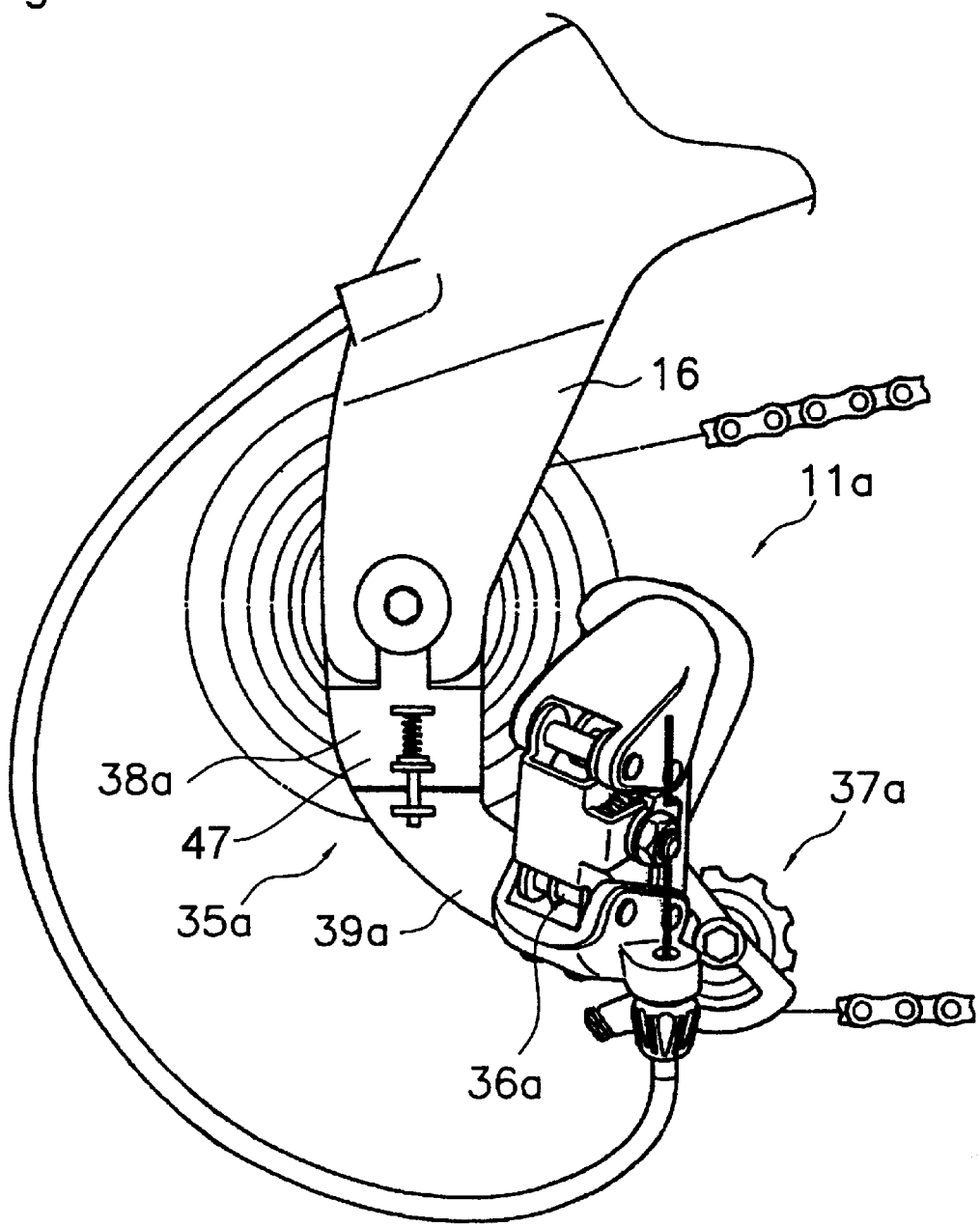
FIG. 5 is a side view of another embodiment of a rear derailleur.

FIG. 5 is a side view of another embodiment of a rear derailleur 11a. Rear derailleur 11a comprises a similarly foldable base member 35a mounted on the back end of second frame body 16, a four-point link mechanism 36a mounted on base member 35a, and a chain guide 37a disposed on four-point link mechanism 26a. Base member 35a comprises a first base member body 38a and a second base member body 39a, and a locking mechanism 47 locks and unlocks first base member body 38a and second base member body 39a to function as described in the first embodiment. In this embodiment, elements other than the locking mechanism 47 are identical to those in the preceding embodiment, so those elements will not be described here.

Figure 6:
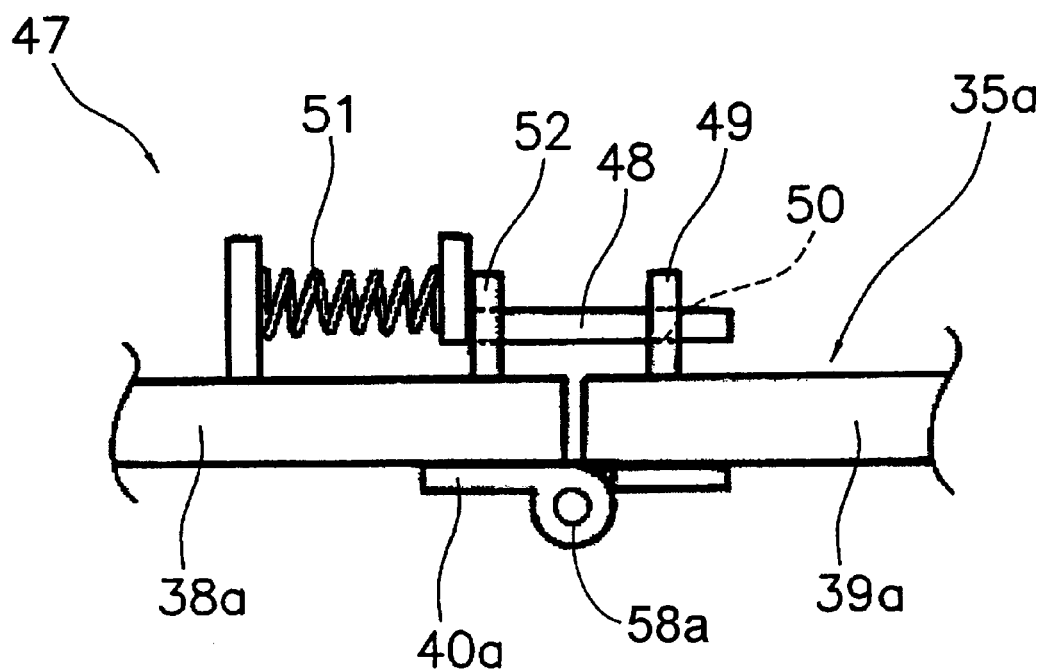
FIG. 6 is a detailed view of a particular embodiment of a coupler for the base member of the derailleur shown in FIG. 5.
Figure 7:
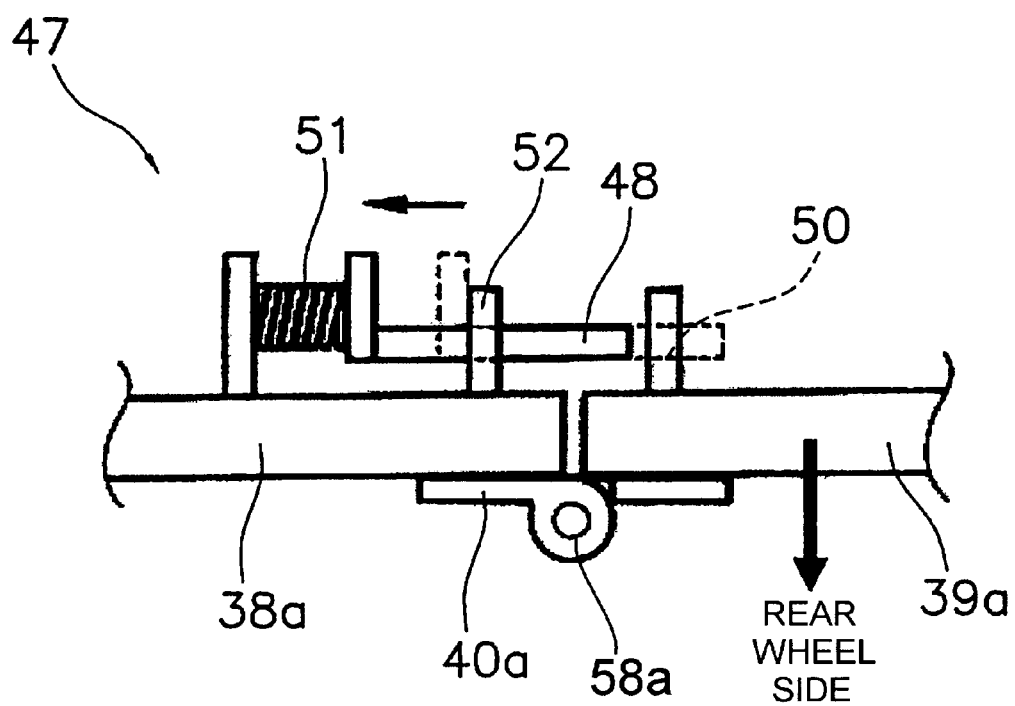
FIG. 7 is a view of the coupler in an unlocked state.

As shown in FIGS. 6–7, locking mechanism 47 is a latch mechanism comprising a lock pin 48 that is extendable and retractable from first base member body 38a towards second base member body 39a, a lock catch member 49 for detaining lock pin 48, and a biasing member 51 comprising a coil spring for biasing lock pin 48 towards lock catch member 49. Lock pin 48 is slidably mounted in a bracket 52 that projects upwardly from first base member body 38a at a location in proximity to second base member body 39a. Lock catch member 49 projects upwardly at a location on second base member body 39a in proximity to first base member body 38a, and it has a lock hole 50 formed therein for interlocking with lock pin 48. By passing lock pin 48 through lock hole 50, first base member body 38a and second base member body, 39a may be locked together for service. Since biasing member 51 biases lock pin 48 towards lock hole 50, lock pin 48 will not disengage from lock hole 50 during service.

When performing the folding operation as noted above, the sidewalls of rear wheel 9 and front wheel 8 will come into proximity with one another, and rear derailleur 11 may contact front wheel 8. To enable the bicycle to be folded more compactly, interference between the rear derailleur 11 and front wheel 8 must be minimized. To accomplish this, first base member body 38a and second base member body 39a may be unlocked simply by sliding the lock pin 48 in the direction of biasing member 51 as shown in FIG. 7. Then, second base member 39a may be folded towards rear wheel 9, and contact between rear derailleur 11a and front wheel 8 may be avoided.

While the above is a description of various embodiments of inventive features, further modifications may be employed without departing from the spirit and scope of the present invention. For example, a buckle-type mechanism and a latch-type mechanism were described as examples of locking mechanisms, but a locking mechanism need not be limited to those taught in those embodiments as long as it is capable of locking and unlocking the base members. Also, the base member 35 was described as being mounted on the back end second frame body 16 integrally with the hub axle 12, but base member 35 could instead be mounted onto the back end of second frame body 16 independently of hub axle 12.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed:

1. A bicycle derailleur comprising:
   a base member;
   a link mechanism coupled to the base member; and
   a chain guide coupled to the link mechanism so that the chain guide moves relative to the base member to move a chain among a plurality of sprockets;
   wherein the base member comprises:
      a first portion comprising a first base member body structured to mount to a bicycle frame;
      a second portion comprising a second base member body structured to mount to the link mechanism; and
      wherein the first portion and the second portion are structured to move laterally relative to each other when the base member is fixed to the bicycle frame; and
   a coupler that flexibly couples the first base member body to the second base member body, wherein the coupler is mounted to laterally facing surfaces of the first base member body and the second base member body.

2. The derailleur according to claim 1 wherein the first portion and the second portion are structured to fold laterally relative to each other.

3. The derailleur according to claim 1 wherein the coupler comprises a pivot shaft that longitudinally pivotably couples the first base member body to the second base member body when the base member is fixed to the bicycle frame.

4. The derailleur according to claim 1 wherein the coupler comprises a hinge that longitudinally pivotably couples the first base member body to the second base member body when the base member is fixed to the bicycle frame.

5. The derailleur according to claim 1 further comprising a locking mechanism that moves between a locked position and an unlocked position, wherein movement between the first base member body and the second base member body is substantially prevented when the locking mechanism is in the locked position, and wherein movement between the first base member body and the second base member body is allowed when the locking mechanism is in the unlocked position.

6. The derailleur according to claim 1 wherein the first base member body and the second base member body are structured to move laterally relative to each other without loosening the coupler.

7. A bicycle derailleur comprising:
   a base member;
   a link mechanism coupled to the base member;
   a chain guide coupled to the link mechanism so that the chain guide moves relative to the base member to move a chain among a plurality of sprockets;
   wherein the base member comprises:
      a first base member body structured to mount to a bicycle frame; and
      a second base member body structured to mount to the link mechanism;
   a coupler that flexibly couples the first base member body to the second base member body; and
   a locking mechanism that moves between a locked position and an unlocked position, wherein movement between the first base member body and the second base member body is substantially prevented when the locking mechanism is in the locked position, and wherein movement between the first base member body and the second base member body is allowed when the locking mechanism is in the unlocked position;
   wherein the locking mechanism comprises:
      a hook coupled to one of the first base member body and the second base member body; and
      a catch member coupled to the other one of the first base member body and the second base member body for engaging the hook.

8. The derailleur according to claim 7 wherein the locking mechanism further comprises a lever member pivotably coupled to the other one of the first base member body and the second base member body, wherein the catch member is coupled to the lever member.

9. The derailleur according to claim 8 wherein the coupler comprises a hinge that pivotably couples the first base member body to the second base member body.

10. A bicycle derailleur comprising:
    a base member;
    a link mechanism coupled to the base member;
    a chain guide coupled to the link mechanism so that the chain guide moves relative to the base member to move a chain among a plurality of sprockets;
    wherein the base member comprises:
       a first base member body structured to mount to a bicycle frame; and
       a second base member body structured to mount to the link mechanism;
    a coupler that flexibly couples the first base member body to the second base member body; and
    a locking mechanism that moves between a locked position and an unlocked position, wherein movement between the first base member body and the second base member body is substantially prevented when the locking mechanism is in the locked position, and wherein movement between the first base member body and the second base member body is allowed when the locking mechanism is in the unlocked position; and
    wherein the locking mechanism comprises a latch.

11. The derailleur according to claim 10 wherein the latch comprises:
    a lock pin disposed on one of the first base member body and the second base member body, wherein the lock pin is extendable and retractable relative to the other one of the first base member body and the second base member body; and
    a lock catch unit disposed on the other one of the first base member body and the second base member body for engaging the lock pin.

12. The derailleur according to claim 11 wherein the latch further comprises a biasing mechanism that biases the lock pin towards the lock catch unit.

13. The derailleur according to claim 11 wherein the latch comprises a bracket coupled to the one of the first base member body and the second base member body and slidably supporting the lock pin.

14. The derailleur according to claim 13 wherein the lock catch portion extends from the other one of the first base member body and the second base member body for engaging the lock catch unit.

15. The derailleur according to claim 14 wherein the latch further comprises a biasing mechanism that biases the lock pin towards the lock catch unit.

16. The derailleur according to claim 15 wherein the coupler comprises a hinge that pivotably couples the first base member body to the second base member body.

17. The derailleur according to claim 16 wherein the lock catch unit includes an opening for receiving the lock pin therein.

* * * * *